(12) United States Patent
Timmer et al.

(10) Patent No.: US 6,400,410 B1
(45) Date of Patent: Jun. 4, 2002

(54) SIGNAL PROCESSING DEVICE AND METHOD OF PLANNING CONNECTIONS BETWEEN PROCESSORS IN A SIGNAL PROCESSING DEVICE

(75) Inventors: Adwin H. Timmer; Jeroen A. J. Leijten; Jozef L. Van Meerbergen, all of Eindoven (NL)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/174,166

(22) Filed: Oct. 16, 1998

(30) Foreign Application Priority Data

Oct. 21, 1997 (EP) ............................................. 97203272

(51) Int. Cl.[7] ................................................. H04N 5/14
(52) U.S. Cl. ........................ 348/571; 348/659; 348/705; 348/706
(58) Field of Search ................................. 348/571, 705, 348/706, 575; 364/221; H04N 5/14, 9/64, 9/67, 5/268

(56) References Cited

U.S. PATENT DOCUMENTS

| | | | |
|---|---|---|---|
| 4,521,874 A | * | 6/1985 | Rau et al. .................... 365/221 |
| 5,055,997 A | * | 10/1991 | Sluijter et al. .............. 710/132 |
| 5,103,311 A | | 4/1992 | Sluijter et al. |
| 5,121,502 A | * | 6/1992 | Rau et al. ..................... 712/24 |
| 6,020,931 A | * | 2/2000 | Bilbrey et al. .............. 348/584 |

OTHER PUBLICATIONS

"The Real–Time Operating System of Mars", by A. Damm et al, ACM operating systems review 23(3), pp. 141–151 (1989).

* cited by examiner

*Primary Examiner*—John W. Miller
*Assistant Examiner*—Trang U. Tran
(74) *Attorney, Agent, or Firm*—Steven R. Biren

(57) ABSTRACT

A signal processing device contains a plurality of processing elements with inputs and outputs coupled via a switch-matrix for communication of signal streams between a set of processes. An arbiter selects the connections made by the switch-matrix. The arbiter makes allocations of inputs and outputs that are to be connected to each other in each of successive time-slots. The allocations for communication of signal streams between the set of processes for a plurality of time-slots are made in advance. The arbiter can also receive requests for making further connections between inputs and outputs. In that case, the arbiter makes said further connection in a time-slot in which the requested inputs and outputs are not used by the set of processes. A method of planning is provided which ensures that full utilization of the switch-matrix is possible.

9 Claims, 3 Drawing Sheets

SIGNAL PROCESSING DEVICE AND METHOD OF PLANNING CONNECTIONS BETWEEN PROCESSORS IN A SIGNAL PROCESSING DEVICE

BACKGROUND OF THE INVENTION

The invention relates to a signal processing device and a method of planning the allocation of time-slots in which connections are made between inputs and outputs of processors via a switch-matrix.

Such a signal processing device is known from U.S. Pat. No. 5,103,311. This device contains a number of processing elements which execute various stages of a video signal processing task in true concurrency. A processing element receives signal samples of signal streams at an input, processes the signal samples and outputs signal samples of a processed signal stream at an output. The streams are communicated between the processing elements via a switch matrix, which establishes a number of connections in parallel, each between the input of a processing element and the output of a source of the signal stream to the input of the processing element. This source may be another processing element or an input of the device.

Each processing element has its own program. The program of a processing element determines from which other processing element samples of a signal stream are received via a switch matrix.

Many of the processing elements may execute several processes in a time-interleaved fashion. To support this, the connections made by the switch-matrix are switched over regularly to receive samples of different signal streams from different sources. These switch-overs are also programmed in the processing element. All connections that are made will thus have been arbited in the program well in advance of execution of the processes. In this way the efficiency of use of the switch matrix and the processing elements can be optimized at the time of programming and real time behaviour can be guaranteed.

However, the programmed arbitration has the disadvantage that the signal processing device lacks the flexibility needed to handle multimedia applications in which various combinations of signal streams have to be handled in different ways, some of them interactively.

An article in the ACM operating systems review 23 (3) pages 141–151 (1989), titled "The Real-Time Operating System of Mars", by A. Damm, J. Reisinger, W. Schwabl and H. Kopetz, teaches a distributed real time data processing system designed for process control. This system uses a single bus to which all inputs and outputs are connected. Real-time behaviour is guaranteed by allocating the bus in predetermined time-slots to transmission of hard real-time messages. The bus is allocated on request to other than hard real-time messages in unused time-slots. This automatically ensures that the inputs and outputs will be available for transmission when the bus is allocated, because with a bus, in contrast to the case of a switch, matrix, the inputs and outputs are dedicated to the single information channel that is allocated to various successive transmissions.

SUMMARY OF THE INVENTION

Amongst others, it is an object of the invention to provide for a signal processing device in which the efficiency of use of the processing elements and the switch-matrix can be optimized and in which real-time behaviour can be guaranteed for a number of signal streams, but which allows for more flexibility in handling signal streams.

The signal processing device according to the invention is characterized in that the arbiter is arranged to receive a request for making a further connection between a specified input and output for further communication between further processes during said plurality of time-slots and to select making said further connection in a time-slot in which said specified input and output are not used by the set of processes for communication of the signal streams for which the allocation is fixed in advance. The invention provides for fixed allocation of connections for a set of processes, so that the efficiency of these processes can be optimized and made to guarantee real-time behaviour. Preferably, the time-slots are allocated in a periodically recurring pattern, which can be programmed in a small memory. The arbiter can also make other connections for the duration of time-slots upon a run time request by the processes involved. These connections are made between inputs and outputs that are not used by the set of processes whose connections are allocated in advance. Unused inputs and output may occur for example because these inputs and outputs are not allocated in advance or because the processing elements indicate that the allocated input and/or output is not actually used by the set of processes at that time.

An embodiment of the processing device according to the invention is where each fraction provides for a succession of at least two samples of a signal stream communicated between an input and output in a time-slot. According to this embodiment the switch matrix always maintains connections between inputs and outputs for a duration so that more than one signal value can be transferred, but much less than an entire stream (or video) frame. This reduces the power consumed by the device because the switch matrix needs to switch less often. At the same time it ensures efficient utilization of the processing elements because it allows flexible switching between processes.

In an embodiment of the processing device according to the invention the allocation of time-slots is programmable. Thus, when a user requires a different function from the device, the set of processes executed by the device can be changed and an allocation that is optimal for the new set of processes can be implemented by the arbiter.

In a further embodiment of the processing device according to the invention first in first out buffers are used for the different streams arriving at a processing element for execution of different processes. In this way, the planning of the allocation can be made independent of the timing of execution of the different processes, so that optimal planning can be used.

The invention further includes a method of planning the allocation of time-slots in a way that ensures that the transmission capability of the switch-matrix can fully be used.

BRIEF DESCRIPTION OF THE DRAWING

These and other advantageous aspect of the invention will described in a non-limitative way using the following figures.

DETAILED DESCRIPTION OF THE PRIMARY EMBODIMENT

Figure 1:
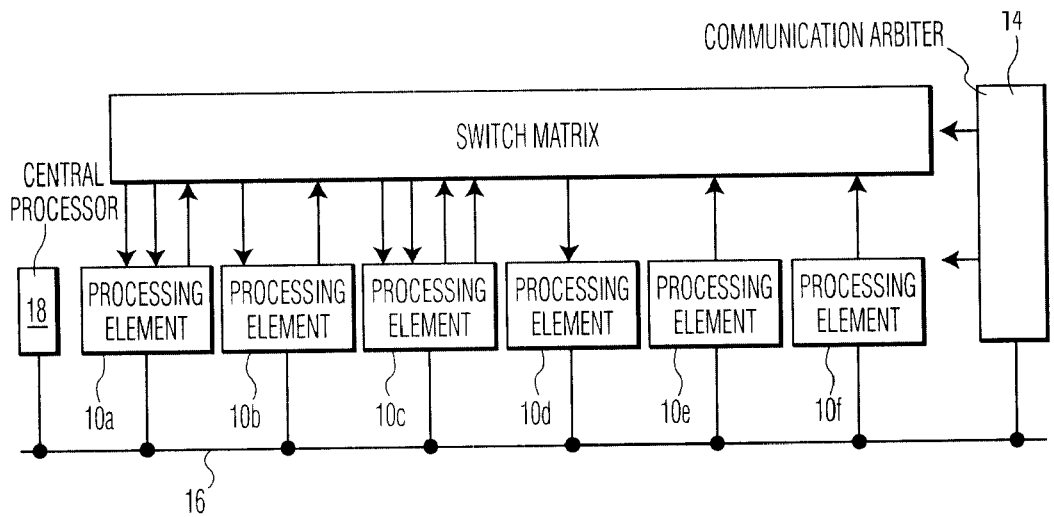
FIG. 1 shows a signal processing device.

FIG. 1 shows a signal processing device. The device contains a number of processing elements 10*a–f* (of which six are shown) interconnected by a switch matrix 12. A communication arbiter 14 has connections (not shown) to the processing elements 10a–f and the switch matrix for selecting connections made by the switch matrix. In addition, the device contains a central processor 18 and a control oriented bus 16 connecting the processing elements 10a–f, the arbiter 14 and the central processor 18.

In operation the signal processing device processes for example a number of video signals simultaneously. These video signals are embodied in streams of successive pixel values. A processing element 10a–f may produce such a stream of pixel values derived for example by processing the pixel values of an input stream, from an external input video signal or by means of a graphics process. A stream of pixel values may also enter a processing element 10a–f, where it is processed according to some predetermined process executed by that processing element 10a–f. Usually, each successive pixel value of a processed signal stream depends on a respective successive pixel value of an incoming signal stream or on a successive sliding window of pixel values.

Typical examples of processes executed by processing elements 10a–f individually include horizontal resolution reduction of a video signal stream, vertical resolution reduction of a video signal stream, filtering, MPEG decoding etc., i.e. processes at a level of granularity where there are few cross-connections between the pipelines, but which often do not by themselves constitute a complete input-output relation between a received video signal and a displayed video signal. Most of these processes need to satisfy hard real-time con straints because these processes result directly or indirectly in output images that need to be displayed in time in order to avoid visible disturbances. Other processes, such as construction of a teletext image need not satisfy hard real-time constraints, but should operate at a guaranteed average speed.

Figure 2:
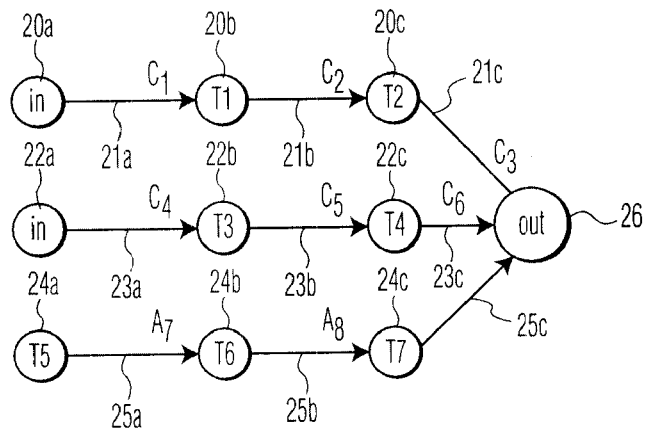
FIG. 2 shows a task graph.

FIG. 2 shows a task graph of a hypothetical simple signal processing task. The task graph uses nodes 20a–c, 22a–c, 24a–c, 26 to symbolically represent a number of processes "input"(2x) T1–T7 and "output", that need to be executed by the processing elements 10a–f. The task graph uses connections 21a–c, 23a–c, 25a–c between the nodes 20a–c, 22a–c, 24a–c, 26 to represent communication of signal streams C1–C6, A7, A8 between these processes. The task graphs shows three pipelines of processes T1–T7, converging at a common output process. An example of the function performed by such a task graph is for example display of two different video signals simultaneously, with an overlaid graphics image.

A number of the connections 21a–c, 23a–c, are shown by solid lines to indicate that the corresponding communication of signal streams C1–C7 needs to satisfy hard real-time constraints. Other connections 25a–c are shown by dashed lines to indicate that no hard real-time constraints need to be satisfied for other signal streams A7, A8. The bandwidth required by the signal streams may differ. For example, the bandwidth of one stream C1 may be twice that needed for each of the other streams C2–C7 individually, if the stream C1 represents a higher resolution image.

In operation the various processes T1–T7 will be executed by the processing elements 10a–f. On each of the processing elements 10a–c several processes T1–T7 may be executed in a time-interleaved fashion. For example, two processes T2, T3 might be executed by a first processing element 10a and other processes T1, T4 might be executed by other processing elements 10b,c. The input processes "input" may execute on two separate input processors 10d, e and the output process may execute on a separate output processor 10f.

Because several processing elements 10a–f may execute more than one process in time interleaved fashion, these processing elements 10a–f need to receive pixel values from more than one different processing element 10a–f at their inputs or to transmit pixel values to more than one different processing element 10a–f from their outputs. In the foregoing example, the processing element which executes processes T2 and T3 would need to receive pixel values from the processing elements executing an input process and process T1 respectively. The processing element executing processes T2 and T3 would need to output to the output processing element and processing element T4 etc.

This imposes constraints on the time-intervals at which communication of signal streams C1–C7 between these processes takes place via the switch-matrix 12, because signal streams cannot arrive at one input of a processing element 10a–f from more than one source at a time, nor can signal streams be transmitted from one output of a processing element 10a–f to more than one destination at a time. (To avoid such constraints on communication, one would need to equip substantially all of the processing elements 10a–f with separate switchable inputs and buffers connected to the switch-matrix 12 for all of the different processes that may be executed by the processing element in time interleaved fashion. However, it has been discovered that the separate switchable inputs would require excessively large integrated circuit chip area if all but a very small number of processes may be executed in time interleaved fashion. Therefore it is undesirable to avoid these constraints).

To ensure the real-time communication of the signals streams C1–C7 under these constraints, the use of the switch-matrix 12 is divided into time-slots. In each time-slot, the switch-matrix 12 makes a set of connections between inputs and outputs. This set of connections may be changed from one time-slot to the next. Preferably, each time-slot allows for the transmission of a number of successive pixel-values. This reduces power consumption in the switch-matrix 12 because in video streams fewer signal transitions tend to be needed between successive pixel-values of one signal stream than between pixel-values of different signal streams. On the other hand, each time-slot allows for transmission of far less than an entire video frame, in order to make it possible that more than one process can be executed in real-time on the same processing element 10a–f without using excessively large buffers. It has been found that 16 pixels values per time-slot is a good compromise, with a pixel frequency (clock frequency) of 64 Mhz.

The arbiter 14 selects which connections the switch-matrix will make. Before the execution of the processes T1–T7 the allocation of connections to signal streams C1–C6 is planned for each time-slot in a way that ensures real-time transmission of the signal streams. Planning may be performed when the programs are compiled, that is, before the processes are actually executed. Preferably, the allocations are periodically repeated with a repetition period that is much smaller than the total time-interval needed to process a video frame. In each period a number of time-slots is allocated to each signal stream C1–C6 in proportion to the bandwidth (pixel values per unit time) needed for that signal stream.

Figure 3:
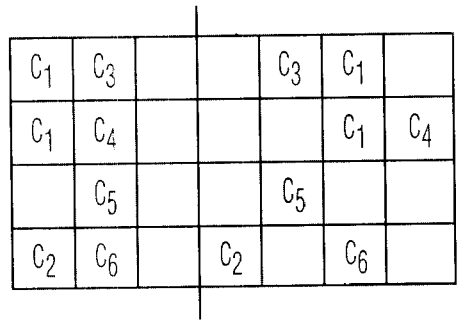
FIG. 3 shows an example of periodic allocation.

FIG. 3 shows an example of such a periodic allocation, represented by a matrix. Successive rows of the matrix correspond to successive time-slots in a period. The three rightmost columns correspond to various inputs of the processing elements 10a–f and the four leftmost columns correspond to various outputs of the processing elements 10a–f. In the matrix it is indicated to which signal stream C1–C6 each input or output is allocated in each time-slot. For example in a first time-slot (upper row) the first input allocated to signal stream C1 and the second input terminal is allocated to signal stream C3. The second output is allocated to signal stream C3 and the third output is allocated to signal stream C1. The second, third and fourth row show to which signal streams C1–C6 the inputs and outputs are allocated in a second, third and fourth time-slot respectively. In a fifth, sixth, seventh and eight time-slot the inputs and output are again allocated as indicated in the first, second, third and fourth row of the matrix respectively and so on. Thus, the allocations are repeated with a period of four time-slots.

It will be noted that inputs and outputs have been allocated to a first signal stream C1 in two time slots in each period and that one input and output have been allocated for the other signal streams C2–C6 in one time-slot. This is because the bandwidth of C1 is twice that of the other streams C2–C6.

The processing elements 10a–f execute the processes that use the received signal values so that on average in each period just as many signal values are processed as there are received. However, execution is not necessarily in lock-step with transmission. The processing elements 10a–f achieve this by buffering the signal values transmitted for a signal stream. Similarly the processing elements 10a–f buffer the signal values of the signal stream generated by the processes. In the buffers at most, M signal values need to be stored, M being the number of signal values that can be transmitted in one period, that is, before the allocations are repeated. If the time to start processing the signal values is carefully selected even a smaller buffer for M/2 signal values is sufficient. When the period is not too long, a relatively small buffer therefore already guarantees that sufficient signal values can always be stored.

Figure 4:
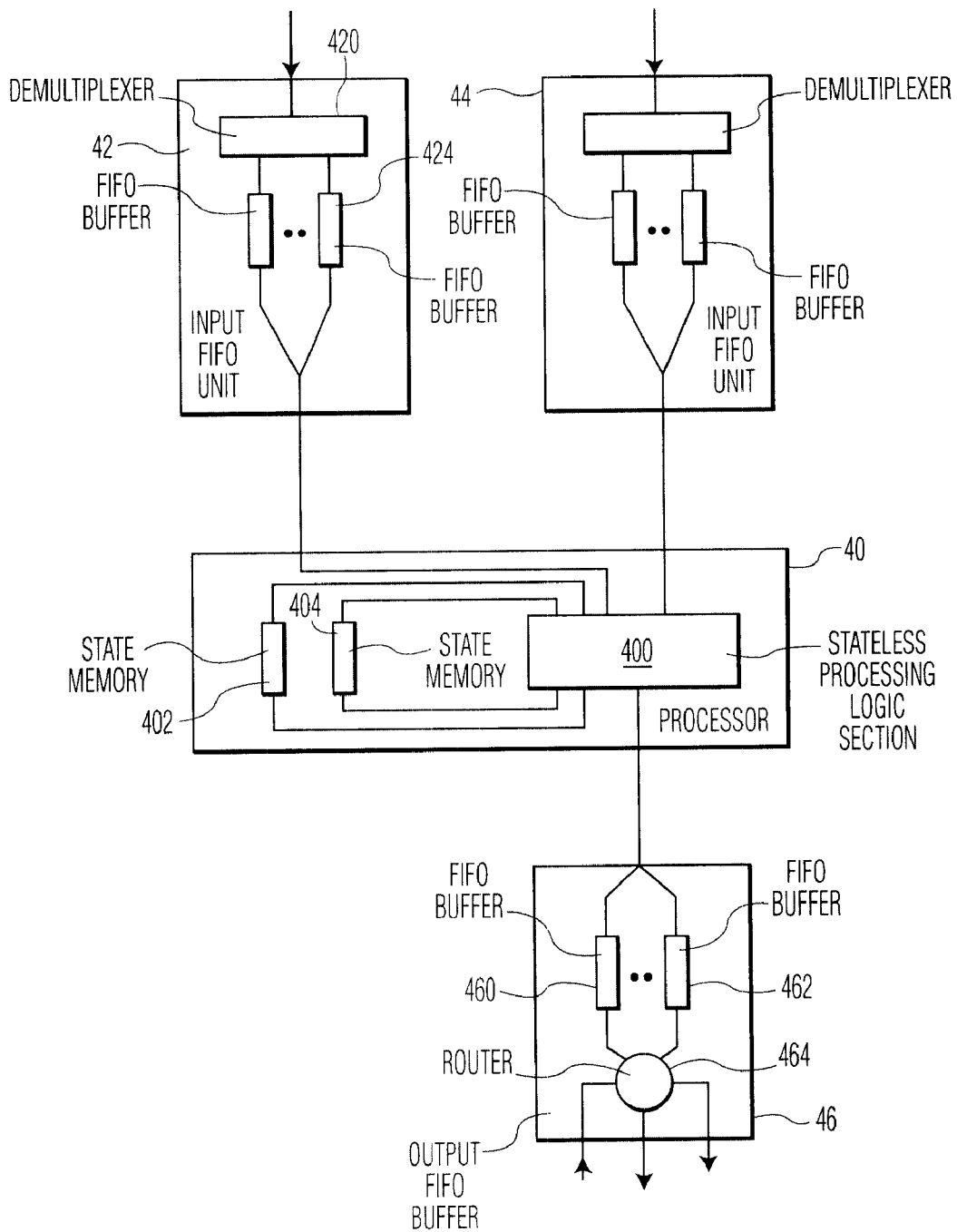
FIG. 4 shows a processing element.

FIG. 4 shows an example of a processing element with two inputs and one output. The processing element contains a processor 40 with two inputs. The processing element has two inputs, which are coupled to respective inputs of the processor 40 via input FIFO (First IN First Out) units 42, 44. The input FIFO units 42, 44 provide for a number of logical FIFO buffers 422, 424, one for each process executed by the processing element. In practice the FIFO's may be implemented as memory that is addressed in a FIFO manner, and the logical FIFO's may share the same memory. A demultiplexer 420 directs the signal values received from the input coupled to the switch matrix to the appropriate FIFO buffer 422, 424. The processor 40 has one output which is coupled to the single output of the processing element via an output FIFO unit 46. The output FIFO unit maintains a number of logical FIFO buffers 460, 462, one for each executed process. The output of the FIFO units 460, 462 are directed to the switch-matrix via a router 464. The FIFO buffers 450, 462 may be implemented for example as separate FIFO's or constructed with one memory for signal values from different FIFO's and a number of pointers to keep track of the memory locations used for the different logical FIFO buffers.

The processor 40 has a stateless processing logic section 400 ("stateless": its output signal at any point in time depends only on its input signal at one point in time and not on more input or output signals) and a number of state memories 402, 404, one for each process that may be executed by the processing element together in interleaved fashion. Switching between the execution of different processes is achieved by switching the input buffers 422, 424 and the state memories that supply input to the stateless processing logic. Thus switch-over between different processes can be realized without any wait states. Signal values from each stream will generally be processed in the order in which they arrive, but switching between different processes does not need to follow exactly the arrival of signal values for different streams: processing of signal values from different streams does not need to be in the order of arrival.

The allocation of inputs and outputs to signal streams C1–C6 of real-time processes T1–T7 in respective time-slots is planned in advance in order to meet the real-time specification, this may be done when the programs are compiled or at run-time before a process starts. The real-time specification is expressed as the required bandwidth of the signal streams C1–C6 involved in the processes T1–T7, for example in terms of the number of time-slots needed for the process in some time-unit. The planning must ensure for every signal stream C1–C6 that both an input and an output and the switch-matrix 12 are available for a sufficient number of time-slots in each period to communicate the signal stream C1–C3.

Preferably a switch-matrix 12 is used that is able to provide as many connections simultaneously as the number M of inputs or outputs connected to the switch matrix 12, whichever is lower. More generally, the switch matrix should preferably provide at least as much bandwidth for transferring signal values to or from the M inputs or outputs per unit time as the processors behind or before the M inputs or outputs are capable of processing per unit time. Thus, the switch-matrix does not impose restrictions on the allocation and it need be assured only that for every signal stream C1–C6 both an input and an output are available for a sufficient number of time-slots.

The number K of time-slots available per time-unit must be sufficiently large in order to ensure that a time-slot can always be found in which the input and the output needed for a particular signal stream C1–C6 are both free at the same time. When inputs and outputs are allocated incrementally to a series of signal streams it has been found that the number K must be equal to or greater than minus one plus twice the number N of time-slots actually used by all the signal streams C1–C6 flowing Xinto an input (K>=2N–1). In incremental planning the allocation is first planned for a subset of the signal streams C1–C6 and then an input and output are allocated to a particular stream outside the subset in a time-slot where both this input and this output are still free. The lower limit on the number K is needed in this case to ensure that the input and output needed by the particular signal stream will both be free in one time-slot of the K time-slots in a worst case when the output is allocated to other signal streams in (N–1) time-slots that differ from all the (N–1) time-slots in which the input is allocated to other signal streams C1–C6.

However, it has been found that it can be guaranteed that an allocation scheme actually exists even if K=N. To find such an allocation scheme, one starts by looking for a set of connections for signal streams C1–C6 between different inputs and outputs in which all those inputs and outputs are included that have to carry signal streams C1–C6 in all time-slots K to meet the real time specification. It can be proven that such a set of connections will always exist. The proof uses a reformulation of the allocation problem in terms of graph theory. A graph is used with nodes that each correspond to an respective input or output. Between the nodes corresponding to each input-output pair as many edges are included in the graph as there are time-slots in the time-unit during which this pair needs to be connected. The looked-for set of connections mentioned at the beginning of this paragraph corresponds to a subset of the edges of the graph in which not more than one edge is connected to any node and to which all nodes are connected that are connected to a maximum number of edges of the graph. A theorem from graph theory set forth in an article by P. Hall, titled "On representations of subsets" published in the Journal of the London Mathematical Society, Vol. 10. pages 26 to 30 (1934) demonstrates that there is always such a subset.

Figure 5:
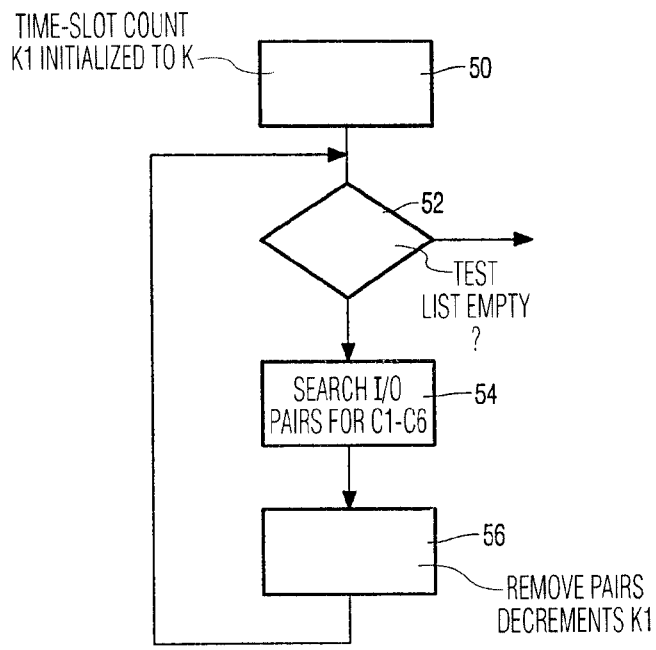
FIG. 5 shows a flow-chart of an allocation planning algorithm.

FIG. 5 shows a flow-chart of an algorithm for planning allocation of inputs and outputs of the processing elements 10a–f to different signal streams in different time-slots. In a first step 50 a time-slot count K1 is initialized to K. A list of input-output pairs is prepared, containing one pair for each time-slot that a connection is needed by any stream C1–C6 in K time-slots. In a second step 52 it is tested whether this list is empty: if so, the planning is finished, if not the algorithm proceeds to a third step 54. In the third step 54, the algorithm searches for a first subset of the list of input-output pairs for signal streams C1–C6. The search is restricted to first subset that meet certain conditions. In all of the pairs of the first subset each input and each output may occur only once and all the inputs and outputs that occur in K1 of the pairs on the list must be included in the first subset. The proof mentioned above guarantees that such a first subset can be found, for example using exhaustive search of all possible subsets, or using a polynomial time graph covering algorithm such as described in the article by P. Hall and in an article by J. E. Hopcroft and R. M. Karp, titled "An nñ(5/2) Algorithm for Maximum Matchings in Bipartite Graphs", SIAM J. Comput., Vol. 2, No. 4, 1973. The first subset corresponds to the connections that will be made in a first time-slot in each time-unit.

In a fourth step 56 the algorithm removes the pairs of the first subset from the list and decrements K1. After that the algorithm repeats from the second step 52. In each repetition the third step produces an allocation for another time-slot. After K repetitions no more connections will be left in the list.

This algorithm produces an allocation plan that, when implemented by the arbiter 14 guarantees that inputs and output connected to the switch matrix 12 will be allocated in a sufficient number of time-slots to the various streams so that the hard real time constrains can be met. In the remaining time-slots that are not used for the streams that have to meet hard real time constraints, other streams can be transmitted that do not have to meet hard real time constraints. The arbiter 14 allocates these remaining time-slots upon requests from the processing elements 10a–f. A processing element issues a request when signal values for such an "other" stream are available and the arbiter 14 grants such a request when an input and output needed for the transfer of the "other" stream are unused in a time-slot for example because this input and output have not been allocated, or because an allocated time-slot is not used.

To ensure that K=N is always possible, the allocations are planned without regard for the time difference between input of signal values into a processor and output of processed signal values from that processor. Also no regard is payed to the relative timing of allocation for different input streams for processes with more than one input stream. Due the allocation of time-slots to aperiodic demands means that the time difference may even be variable. Thus it is undesirable to impose restrictions on the time-difference between input and output beyond what follows from using a periodically recurring pattern of allocations.

The FIFO buffers 422, 424, 460, 462 ensure that it is possible to execute the processes under these conditions. For example, a processor may resume a process when it detects that a time-slot is allocated for output from that process. In this case signal values that are input to different processes executed by the processor will not necessarily be executed in the same sequence as they arrive at the processing element. By buffering signal values from different signal streams for different amounts of time in the FIFO buffers 422, 424 these signal values can be kept waiting until a time-slot is available for output. In this case a FIFO buffer is not normally needed at the output of the processing element. (In this case the FIFO is needed only in processors that are capable of producing multiple output streams from a single process or in case there is not a one to one correspondence between the input signal values and the output signal values, e.g. for variable length decoding or subsampling).

Figure 6:
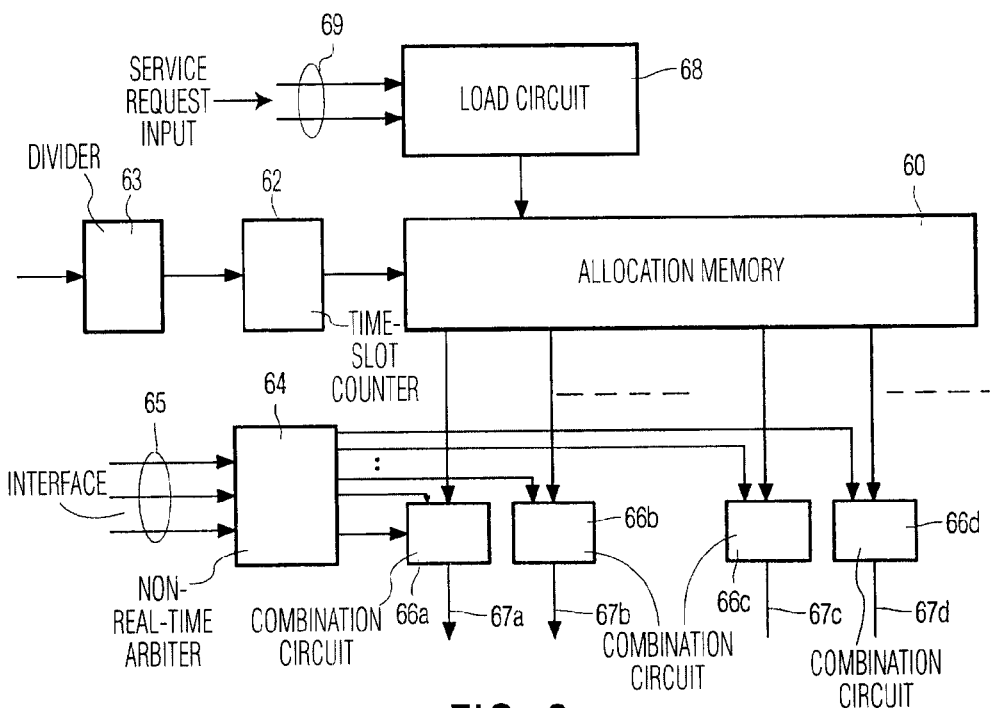
FIG. 6 shows an arbiter.

FIG. 6 shows an embodiment of an arbiter that performs such an allocation. The arbiter contains a load circuit 68, with hard-real-time service request inputs 69. An output of the load circuit are coupled to an allocation memory 60. The allocation memory 60 has outputs coupled to outputs 67a–d of the arbiter via respective combination circuits 66a–d. The allocation memory 60 has an address input coupled to a time-slot counter 62. A signal value clock input is coupled to a count input of the time-slot counter 62 via divider 63. The arbiter contains an non-real-time arbiter 64, with an interface 65 for communication requests and outputs coupled to the combination circuits 66a–d.

In operation the allocation memory 60 stores information determining the allocation of inputs and outputs of the switch matrix 12 to respective processes in different time-slots. The allocation memory 60 has a respective location for each time-slot. The content of each location has entries for each input and each output connected to the switch-matrix 12. Each entry specifies to or from which logical FIFO connected to the input or output signal values must be passed, and how the input or output is to be connected internally in the switch-matrix.

The contents of respective locations of the allocation memory 60 are output in successive time-slots. To this end, a clock signal is applied to the divider 63 and the divider 63 applies a count pulse to the time-slot counter 62 every Q-clock cycles. Each clock cycle marks simultaneous transport of one set of signal values via the switch-matrix 12. A time-slot contains Q such transports (Q=16 for example). The count value of the time-slot counter 62 represents the time-slot cycle number and is used as address for the allocation memory 60. In response, the allocation memory 60 outputs the contents of the location for the time-slot. The various entries of this content are passed to the functional elements 10a–f and the switch-matrix 12, to select the appropriate logical FIFO's and the appropriate connections respectively.

The load circuit 68 contains information representing the allocation plan that has been made for the device. This plan allocates inputs and outputs to signal streams in different time-slots. The load circuit 68 has hard-real-time service request inputs 69 via which it is informed that one of the planned signal streams has to start. In response, the load circuit 68 loads information into the locations of the allocation memory 60 in which inputs and outputs are allocated to that signal stream. This information is selected so that will cause the switch matrix and the logical FIFO's to make the connections. The loading may be realized for example by incluing a, respective program in the load circuit 68 for each stream and by executing the load program for a particular stream when it is signalled that that particular stream starts.

When a signal stream ends, this is also signalled to the load circuit 68, which thereupon resets the entries made in the allocation memory 60 for that stream. Thus, no enabling signals for an allocated input and output will be passed from the allocation memory 60 to the switch matrix 12 in the time-slots allocated to a signal stream when that signal stream is not active. Of course, enabling signals for inputs and outputs will not be passed from the allocation memory 60 to the switch matrix 12 in the time-slots either when these inputs and outputs have not been allocated at all.

The non-real-time arbiter 64 receives further requests for the use of input-output pairs for transferring signal streams that do not need to satisfy hard real-time constraints. The non-real-time arbiter 64 arbitrates conflicts between these further requests in a conventional way and outputs control signals for each input and output connected to the switch matrix and the functional elements, to signal which input and output should be connected and which logical FIFO should be used. These control signals are fed to the combination circuits 66*a*–*d*. The combination circuit pass these control signals to the switch matrix 12 and the processing elements 10*a*–*f* only if they receive no enabling signals from the allocation memory 60. Otherwise, the combination circuits 66*a*–*d* pass the signals from the allocation memory 60. This leaves the possibility that the combination circuits 66*a*–*d* pass control signals for only one input or output of an input-output pair needed by a non-real-time signal stream. This is detected and signal transfer is suppressed by the switch-matrix. It is signalled back to the sources of the non-real time requests whether the requests have been granted.

Thus, allocation of inputs and outputs determined by the allocation memory 60 will always have precedence over allocation to non-real-time requests. The non-real time requests will be granted in the time-slots that inputs and output are not used for hard real-time signal streams, either because these inputs and output are not allocated or because the hard real-time stream is not active.

The central processor 18 is connected to a user interface (not shown). A human user can use the user interface to select the function or combination of functions that needs to be performed by an apparatus containing the device. When the apparatus executes a specific function or combination of functions it will be said to be in a specific state. Thus, the user can switch the apparatus between a number of different states. Each state corresponds to a respective set of processes that have to be executed simultaneously under hard real-time constraints. To make optimum use of the device, preferably a separate allocation plan is made for each state. The allocation plan specifies which inputs and outputs of the processing elements 10*a*–*f* are allocated to signal streams in which time-slots. In principle, this allocation plan could be planned each time a new state occurs, for example by the central processor 18, but plans can also be made in advance for each possible state of the apparatus in which the device may be used and stored in the device. When the user switches the apparatus to a specific state, the allocation plan for that state is retrieved and loaded into the load circuit 68 of the arbiter 14 by the central processor 18.

Switches between states can also be triggered by internal events. For example, if the user triggers a switch between a first and second state, it may be necessary to finish processing several images that started before the switch was triggered and to start processing different images only after processing of the several images has finished. In this case one defines a number of intermediate states, through which the apparatus passes from the first state to the second state. Each intermediate state will have its own set of processes and its own allocation plan loaded into the arbiter 14. The transitions between first state, the intermediate states and the second state are triggered by internal events, such as the completion of a process. This series of state transitions is enabled for example by a signal received from the user interface.

Execution of processes by the processing elements 10*a*–*f* is started on the basis of a data-flow principle. Among the processing elements 10*a*–*f* there are input processors which receive external inputs, such as video signals. These input processors are programmed to generate signal streams and to feed these signal streams to the other processing elements 10*a*–*f* via the switch-matrix 12.

If an input processor is programmed to generate a signal stream, the input processor detects an external event, such as the start of a video frame, which is programmed to start the signal stream. In response the input processor sends a hard real time request to the arbiter 14 to obtain allocation of the output of the input processor and a corresponding input of another processing element 10*a*–*f* for that signal stream. When the arbiter 14 signals that a connection is available for the signal stream, the input processor first sends a header that identifies the signal stream and subsequently it sends the signal values of the signal stream. The header and following signal values are distributed over a number of time slots in which the arbiter 14 signals allocates the input and output to the signal stream. Interleaved in other time-slots other signal streams may pass through the input and output. When the output is not available, the input processor buffers the signal values in a FIFO buffer. The preplanned allocation ensures that sufficient time-slots are allocated so that no buffer overflow occurs, in the input processor. Eventually, for example when the video frame is finished, the input processor signals to the arbiter 14 that the inputs and output need no longer be allocated.

A processing element 10*a*–*f* which receives the signal stream from the input processor first reads from the header which signal stream has started. In response, the processing element 10*a*–*f* starts the process that processes this signal stream. The processing element 10*a*–*f* may determine this for example from a stored table of correspondences between signal streams and processes. After it has been started the process generates a processed signal stream, which contains a new header followed by signal values of the processed signal stream. These signal values (and if necessary the header) are put in a logical FIFO buffer. Just as the input processor the processing element 10*a*–*f* requests from the arbiter 14 allocation of inputs and outputs for the processed signal stream and transmits the header and signal values when the arbiter 14 signals that input and output are available in a time-slot. After the input signal stream ends, the processing element 10*a*–*f* also ends the processed signal stream and signals to the arbiter that the inputs and output need no longer be allocated.

Thus each processing element 10*a*–*f* except the input stream is triggered by the arrival of a signal stream. A more detailed description of the data-flow principle can be found in co-pending patent application No. to the same inventors as the present application the parts of this co-pending application describing the data-flow mechanism are incorporated herein by way of reference.

What is claimed is:

1. A signal processing device comprising
   a plurality of processing elements,
   inputs and outputs to and from the processing elements in the plurality, a switch-matrix coupled between the inputs and outputs and suitable for making two or more selectable connections between the inputs and outputs simultaneously for communication of signal streams between a set of processes executing in parallel on the processing elements, an arbiter for selecting the connections made by the switch-matrix, the arbiter making a respective allocation of inputs and outputs that are to be connected to each other in each of successive time-slots for communicating predetermined fractions of the signal streams, the arbiter fixing the respective allocations for said communication of signal streams between the set of processes for a plurality of time-slots in advance, characterized in that the arbiter is arranged to receive a request for making a further connection between a specified input and output for further communication between further processes during said plurality of time-slots and to select making said further connection in a time-slot in which said specified input and output are not used by the set of processes for communication of the signal streams for which the allocation is fixed in advance, wherein the arbiter further comprises a real-time arbiter and a non-real-time arbiter.

2. A signal processing device according to claim 1, wherein each fraction provides for a succession of at least two samples of a signal stream communicated between an input and output in a time-slot.

3. A signal processing device according to claim 1, wherein the arbiter fixes the respective allocations so that they recur in periodic cycles.

4. A signal processing device according to claim 3, wherein respective numbers of time-slots allocated for respective signal streams in the periodic cycle differ according to bandwidths of the respective signal streams.

5. A signal processing device according to claim 1, wherein the arbiter is dynamically reprogrammable for changing a set of the respective allocations which is fixed in advance upon changing a set of the processes executing in parallel during the operation of an apparatus.

6. A signal processing device according to claim 5, wherein at least one processing element is arranged for maintaining a plurality of FIFO buffers each for receiving successive signal samples from a respective stream input to a process executed by the at least one processing element, execution of each process being decoupled from the time-slots in which signal samples for the process are communicated via the switch-matrix.

7. A signal processing device according to claim 6, wherein the at least one processing element contains a plurality of state memories, each for storing a processing state of a respective process, the processing element switching between the processes by switching between the state memories and between the FIFO buffers.

8. A signal processing device according to claim 7, wherein the at least one processing element switches to a particular process in each time-slot where allocation is provided for output from that particular process via the switch-matrix.

9. A method of planning allocation of time-slots in which inputs and outputs of processing elements executing concurrent processes are connected to each other via a switch-matrix, the method comprising compiling a list of input-output connections that need to be planned for respective time-slots from a basic period of time-slots;

searching for a set of connections from the list so that each input and each output occurs at most once among the connections in the set and any particular input or output is included in the connections of the set when this particular input or output has to be connected in no fewer time-slots of the basic period than any other of the inputs or outputs that occur among the connections in the list;

setting the allocation in a particular time slot so that all input-output connections in the set occur in that time-slot;

repeating the searching and setting steps for the connections that remain to be planned outside the particular time-slot, wherein the setting step is accomplished using at least a real-time arbiter and a non-real-time arbiter.

* * * * *